United States Patent
Mravca et al.

(10) Patent No.: US 11,997,986 B2
(45) Date of Patent: Jun. 4, 2024

(54) PET TREAT HOLDER

(71) Applicant: BarkerFun, Inc., Austin, TX (US)

(72) Inventors: Susan Mravca, Austin, TX (US); Jim Mravca, Sunnyvale, CA (US)

(73) Assignee: BarkerFun, Inc., Austin, TX (US)

( * ) Notice: Subject to any disclaimer, the term of this patent is extended or adjusted under 35 U.S.C. 154(b) by 2 days.

(21) Appl. No.: 17/334,661

(22) Filed: May 28, 2021

(65) Prior Publication Data

US 2021/0368739 A1    Dec. 2, 2021

Related U.S. Application Data

(60) Provisional application No. 63/033,759, filed on Jun. 2, 2020.

(51) Int. Cl.
*A01K 15/02*     (2006.01)
*A01K 29/00*     (2006.01)
*F16M 13/02*     (2006.01)

(52) U.S. Cl.
CPC ............ *A01K 15/026* (2013.01); *A01K 29/00* (2013.01); *F16M 13/022* (2013.01)

(58) Field of Classification Search
CPC .................................................... A01K 15/026
USPC ........................................................ 269/249
See application file for complete search history.

(56) References Cited

U.S. PATENT DOCUMENTS

| | | | | |
|---|---|---|---|---|
| 2,778,393 A * | 1/1957 | Golasowski | ............ | B25B 5/003 269/97 |
| 5,090,670 A * | 2/1992 | Yang | ........................ | B25B 5/003 269/45 |
| D344,226 S * | 2/1994 | Glynn | .............................. | D8/73 |
| 5,829,391 A * | 11/1998 | Krietzman | ........... | A01K 15/025 119/708 |
| 5,865,146 A | 2/1999 | Markham | | |
| 6,126,159 A * | 10/2000 | Dornfeld | ................... | B25B 5/08 269/254 R |
| 9,848,585 B1 * | 12/2017 | Perozo | ................. | A01K 15/025 |
| 10,701,899 B1 | 7/2020 | Shrestha | | |
| 10,701,900 B1 | 7/2020 | Shrestha | | |
| 10,716,290 B1 | 7/2020 | Dewey | | |
| 10,785,959 B2 | 9/2020 | Shrestha | | |
| 10,925,258 B1 * | 2/2021 | Noaeill | ................ | A01K 15/026 |
| 2002/0084565 A1 * | 7/2002 | Dautartas | ............... | G02B 6/423 269/902 |
| 2003/0205206 A1 | 11/2003 | Natale et al. | | |
| 2011/0232583 A1 * | 9/2011 | Yamin | .................. | A01K 15/026 119/710 |

(Continued)

FOREIGN PATENT DOCUMENTS

EP            1919277 B1     4/2016

OTHER PUBLICATIONS

"Goplus® Bench Vise Swivel 3 Tabletop Clamp Vice Tilts Rotate 360° Universal Work," Web page <https://www.amazon.com/Goplus-Swivel-Tabletop-Rotate-Universal/dp/B01AA12CWM/ref=sr_1_6?crid=2QNVRLIIDSI72&keywords=vise+with+swivel&qid=1658342840&s=hi&sprefix=vise+with+swivel%2Ctools%2C75&sr=1-6>, retrieved on Oct. 2, 2022.

(Continued)

*Primary Examiner* — Joshua D Huson
*Assistant Examiner* — Alanna K Peterson
(74) *Attorney, Agent, or Firm* — J. Roger Williams, Jr.

(57) ABSTRACT

A pet treat holder comprising a body, a clamp, a gripper frame, and a treat gripper, and a method of providing a pet treat to an animal.

17 Claims, 11 Drawing Sheets

(56) References Cited

U.S. PATENT DOCUMENTS

2018/0303071 A1* 10/2018 Allen, Jr. .................. B25B 5/06

OTHER PUBLICATIONS

"BONEHEAD Large—Himalayan Pet Supply," Web page <https://www.amazon.com/BONEHEAD-Large-Himalayan-Pet-Supply/dp/B079RLQFWC/ref=sr_1_32?dchild=1&keywords=Himalayan%E2%80%8B+Pet+Supply%E2%80%8B&qid=1591215168&sr=8-32>, retrieved on Oct. 2, 2022.

* cited by examiner

PET TREAT HOLDER

This application claims priority to and incorporates by reference in its entirety U.S. Provisional Patent Application No. 63/033,759, filed Jun. 2, 2020.

FIELD OF THE INVENTION

This invention relates to a pet treat holder.

BACKGROUND OF THE INVENTION

Dogs and other pets enjoy pet treats, food treats, and chew toys. Pet owners give their dogs and pets pet treats and pet toys for the pleasure of it, but also for utilitarian reasons such as training, diverting the dog's destructive energy, entertaining the dog, rewarding the dog, and diverting the dog's attention. Some dogs are enthusiastic or aggressive chewers, and pet treats such as pizzle sticks, yak cheese sticks, bully sticks, rawhide sticks or strips, bone, and antler, are popular chew toys for these dogs.

One problem, especially with enthusiastic or aggressive chewers, is that there is no way to grip or secure the chew toy so that the pet can enjoy it. There are devices on the market that can grasp a pizzle stick or bone, but they do not hold the stick/bone in place. The only other option is to hold the stick, bone or treat in your hand or with a pair of pliers. Using pliers or your hands is entirely inconvenient, messy, is not possible for many pet owners, and prevents the pet owner from doing other things while the pet is chewing the stick, bone or treat. There is a need for a device that can securely grip pet treats for consumption by dogs and other pets.

Pet treats, moreover, come in all shapes and sizes. There is a need for a device that can securely hold pet treats of all shapes and sizes.

Further, enthusiastic or aggressive chewing can be dangerous. Puppies and some dogs may try to swallow partially-consumed pizzle sticks or bones, which may lead to choking or serious esophageal damage. There is a need for a device that will allow pets to consume most of a pet treat so that the remaining unconsumed portion is unlikely to create a choking hazard or can be safely disposed of.

There is also a need to provide the treats to the dog in the air and off the ground. There are conventional pet treat holders which are not mounted and rest on the ground, but these conventional devices have drawbacks. Outside, use of these devices encourages the dog to roll or bury the treat in the dirt and consume dirt. The dog can then bring this dirt-covered treat inside. Inside, these toys lead to dog slobber on the carpet, wood floors, furniture and other living surfaces.

Finally, dogs and other pets come in all heights. There is a need for a pet treat holder that can be installed at any height to accommodate dogs and other pets of different sizes.

SUMMARY

In accordance with the purpose(s) of the invention, as embodied and broadly described herein, this disclosure, in one aspect relates to pet treat holders, and specifically, to a pet treat holder comprising a body, a clamp, a gripper frame, and a treat gripper.

In an aspect, the gripper frame may be affixed to the body at an angle, and in another aspect, the gripper frame may be flared.

In another aspect, the present disclosure provides a pet treat holder comprising means for gripping a pet treat and means for securing said pet treat gripping means to a fixed object to provide the pet treat off the ground to an animal.

In another aspect, the present disclosure provides a method of providing a pet treat to an animal, comprising clamping a pet treat holder to a fixed object, securely gripping a pet treat within a gripper frame of the pet treat holder, and providing the pet treat off the ground for consumption by the animal.

BRIEF DESCRIPTION OF THE DRAWINGS

The detailed description may refer to the following drawings, wherein.

DETAILED DESCRIPTION

Disclosed herein are embodiments of an improved pet treat holder. The embodiments disclosed herein hold a dog treat in a fixed location and off the ground. They use inverted pyramids to hold different size and shaped treats. They use a second inverted pyramid to allow more access to the treat so there is less left over. And they can be attached at any height to accommodate and entertain animals of any size.

Figure 1:
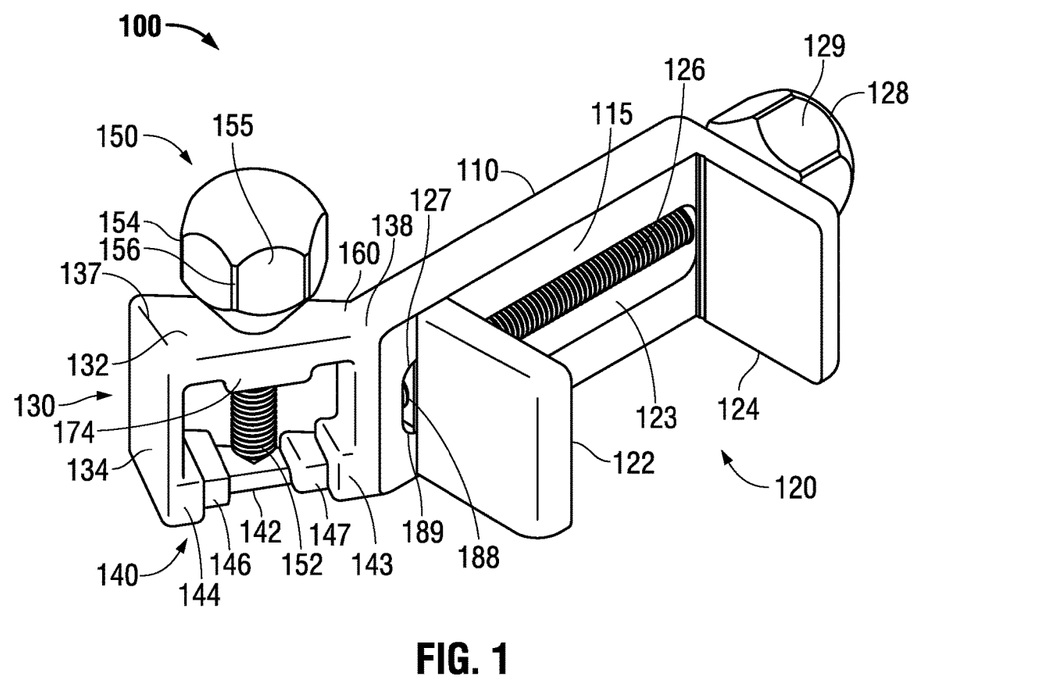
FIG. 1 is a perspective view of an exemplary pet treat holder.

FIG. 1 is a left perspective view of an exemplary pet treat holder 100. Pet treat holder 100 includes body 110, clamp 120, gripper frame 130, and treat gripper 150. Body 110 includes clamp plane 115 and neck 160 where body 110 meets gripper frame 130.

In an embodiment, clamp 120 includes clamp handle 128, fixed jaw 124, moveable jaw 122, and clamp screw 126. Clamp screw 126 is rotated by clamp handle 128 to spin in place within cavity 123. The terminal end of clamp screw 126 extends through threaded hole 188 in tab 189 of moveable jaw 122, and the handle end of clamp screw 126 extends through a hole (not shown) in body 110 (which may be threaded) where it is affixed to clamp handle 128. In alternative embodiments, the terminal end of clamp screw 126 may extend through threaded hole 188 and into a recess within body 110 (not shown), or the terminal end of clamp screw 126 may be secured within cavity 123 by a slip ring or retaining ring. Rotation of clamp handle 128 causes clamp screw 126 to spin and to displace moveable jaw 122 along clamp plane 115 towards fixed jaw 124 to tighten the clamp or away from fixed jaw 124 to loosen the clamp.

Gripper frame 130 includes an upper frame element 132 with front surface 174, an outer frame element 134, and lower frame element 140. In an embodiment, gripper frame 130 is flared or includes a flared shape. In an embodiment illustrated in FIG. 1, for example, the width of upper frame element 132 (and in an embodiment the width of outer frame element 134 where it meets upper frame element 132) at the distal side 137 of gripper frame 130, is greater than the width of upper frame element 132 at the body (or proximal) side 138 of frame 130 where it meets body 110 at neck 160. In an embodiment the width of gripper frame 130 at the body side equals the width of body 110. Treat gripper 150 includes gripper handle 154 attached to gripping screw 152. Gripping screw 152 is threaded through a threaded hole (not shown) in upper frame element 132. Lower frame element 140 includes a gripper base 142 and stepped ridges (or indentations) 144, 146, 147, and 143.

Figure 2:
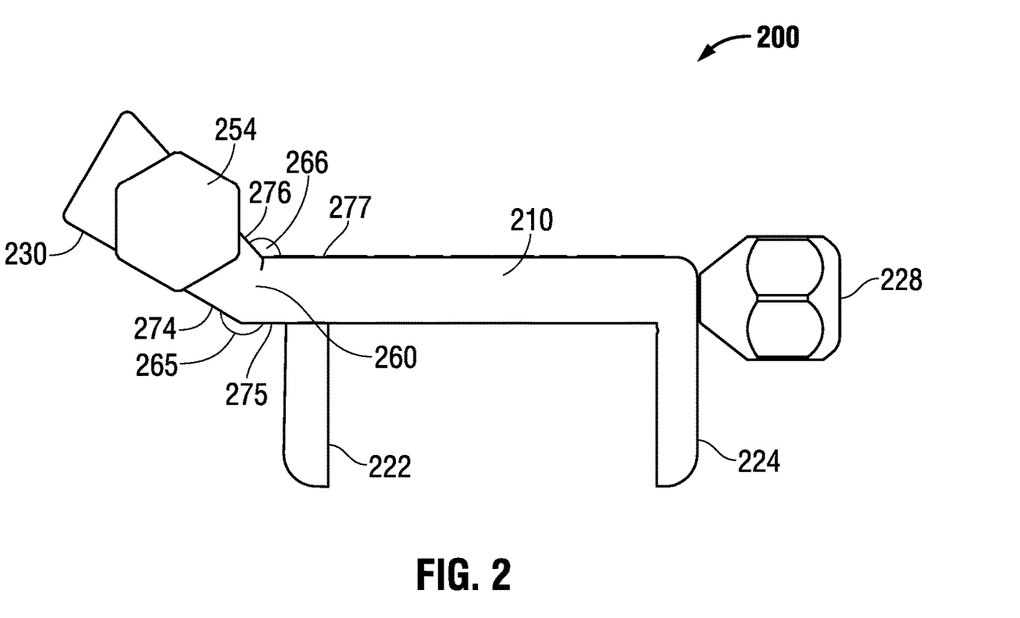
FIG. 2 is a top view of an exemplary pet treat holder.

FIG. 2 is a top view of an exemplary pet treat holder 200, including body 210, clamp jaws 222 and 224, clamp handle 228, and gripper handle 254. Gripper frame 230 meets body 210 at neck 260. In an embodiment, gripper frame 230 is angled relative to body 210 at neck 260, forming angles 265, between front surface 275 of body 210 and front surface 274 of gripper frame 230, and angle 266, between rear surface 277 of body 210 and rear surface 276 of gripper frame 230. In an embodiment, angle 266 is obtuse, ranging from 90 to 180 degrees, including 110-170, 120-160, or 130-150 degrees, and angle 265 is a reflex angle, ranging from 180 to 270 degrees, including 190-270, 200-260, or 210-250 degrees. In another embodiment, angle 265 is obtuse and ranges from 90 to 180 degrees. In an embodiment, neither angle 265, 266 is 180 degrees, and in another embodiment, one but not both of angles 265 and 266 may be 180 degrees.

Figure 3:
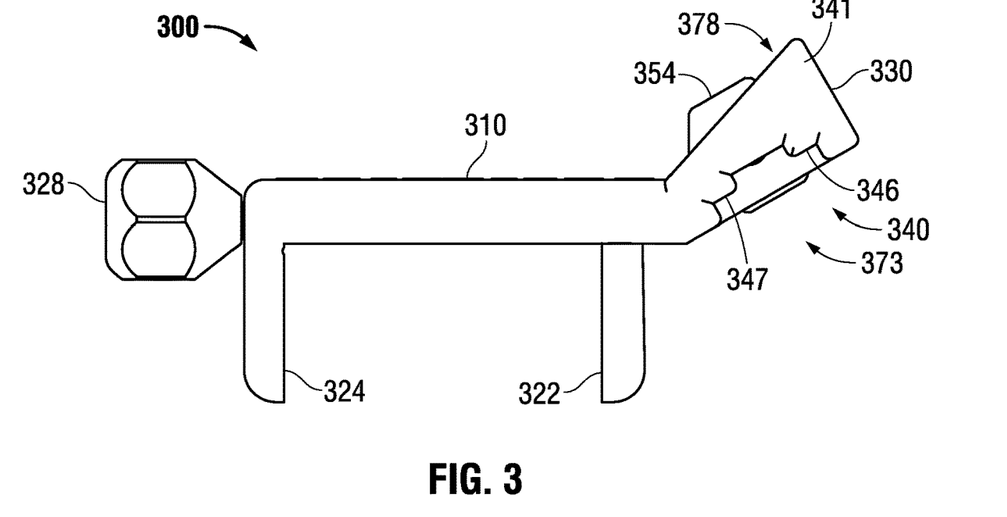
FIG. 3 is a bottom view of an exemplary pet treat holder.

FIG. 3 is a bottom view of an exemplary pet treat holder 300 showing body 310, clamp handle 328, clamp jaws 322, 324, gripper frame 330, and a partial bottom view of gripper handle 354. FIG. 3 shows bottom surface 341 of lower frame element 340. In the embodiment shown in FIG. 3, lower frame element 340 includes stepped ridges, including ridges 346, 347, on the inside aspect 373 of gripper frame 330. In an alternative embodiment, lower frame element 340 includes stepped ridges on the outside aspect 378 of gripper frame 330, and in yet another embodiment lower frame element includes stepped ridges on both the inside aspect 373 and outside aspect 378 of gripper frame 330.

Figure 4:
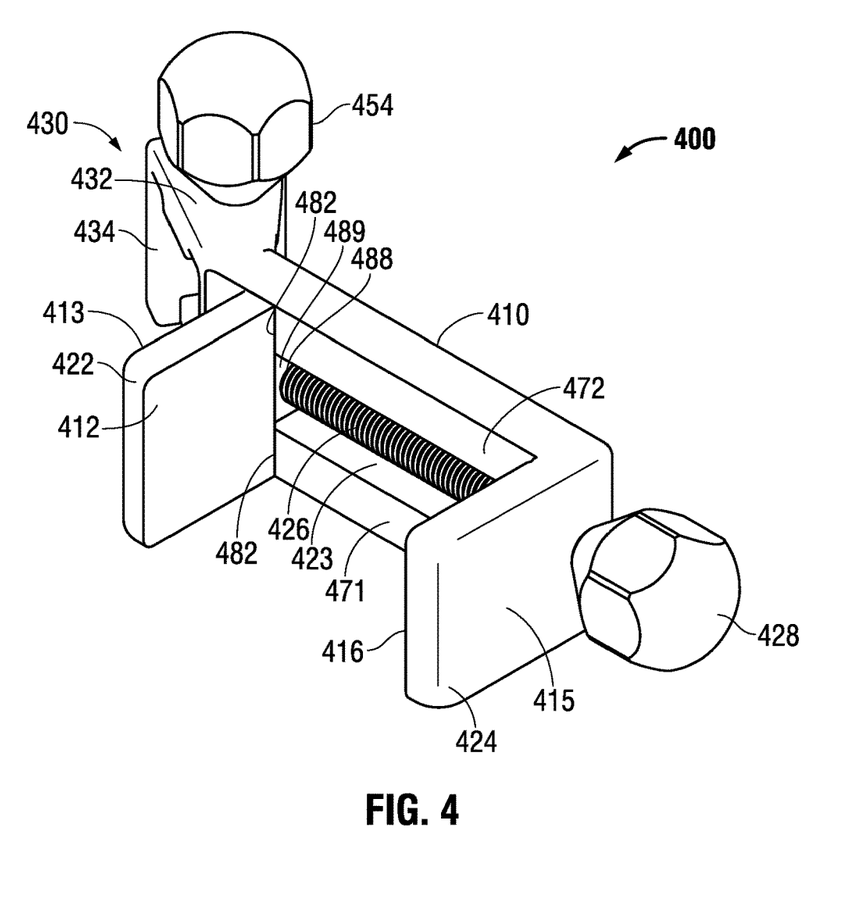
FIG. 4 is a perspective view of an exemplary pet treat holder.

FIG. 4 is a perspective view of an exemplary pet treat holder 400, including body 410, clamp handle 428, clamp jaws 422, 424, gripper frame 430 with upper frame element 432 and outer frame element 434, and gripper handle 454. Moveable clamp jaw 422 includes outer surface 413 and inner clamping surface 412, and fixed clamp jaw 424 includes outer surface 415 and inner clamping surface 416. Clamp screw 426 sits in cavity 423. Clamp plane 415 includes planar surfaces 471, 472 along which the bottom surface 482 of moveable clamp jaw 422 travels when displaced by rotation of clamp screw 426. Tab 489 of moveable jaw 422 holds clamp screw 426 in threaded hole 488.

Figure 5:
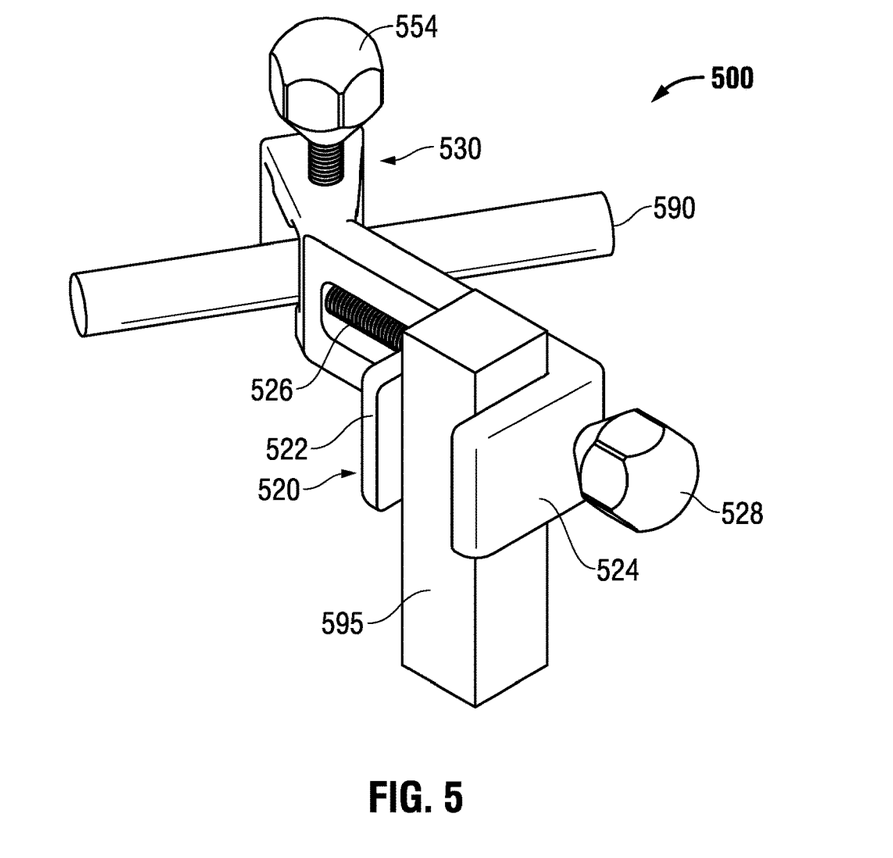
FIG. 5 is a perspective view of an exemplary pet treat holder clamped to a fixed object and holding a pet treat.

FIG. 5 is a perspective view of an exemplary pet treat holder 500 mounted on post 595 with clamp 520 and gripping a dog treat 590 within gripper frame 530. Clamp jaws 522 and 524 securely hold pet treat holder 500 to post 595. Clamp 520 can be tightened or loosened by rotating clamp handle 528 to adjust the position of moveable jaw 522.

Figure 6:
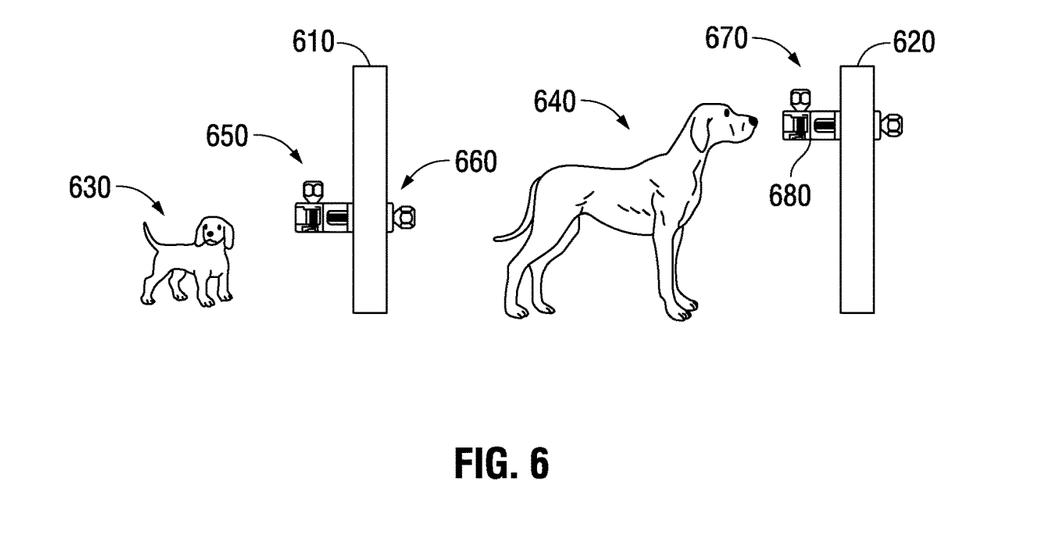
FIG. 6 illustrates exemplary pet treat holders installed at different heights.

FIG. 6 illustrates an advantageous feature of embodiments of the pet treat holder disclosed herein. The pet treat holder can be installed at any height to accommodate dogs (and other animals) of different heights and sizes. On the left, pet treat holder 660 is secured to post 610 at a low height 650 at or about the jaw height of puppy 630, whereas on the right, pet treat holder 680 is positioned at a higher height 670 on post 620 at or about the jaw height of a taller dog 640. Some dogs enjoy consuming the treats while standing, whereas others consume the treats while sitting, kneeling, prone, or lying down, or any combination thereof. The pet treat holder can be installed at an appropriate height for each of these positions.

In an embodiment, the clincher frame includes a ridged (or indented or, in an embodiment, grooved) interior to assist in holding the food item in place and a ridged (or indented) food holder for strength that also allows for the maximum amount of the product to be consumed before releasing it from the device. In an embodiment, the ridged interior of the clincher frame defines a cavity shaped like an inverted pyramid to accommodate and securely hold a variety of shapes including cylinders, rectangles and oddball shapes within the clincher frame.

Figure 7A:
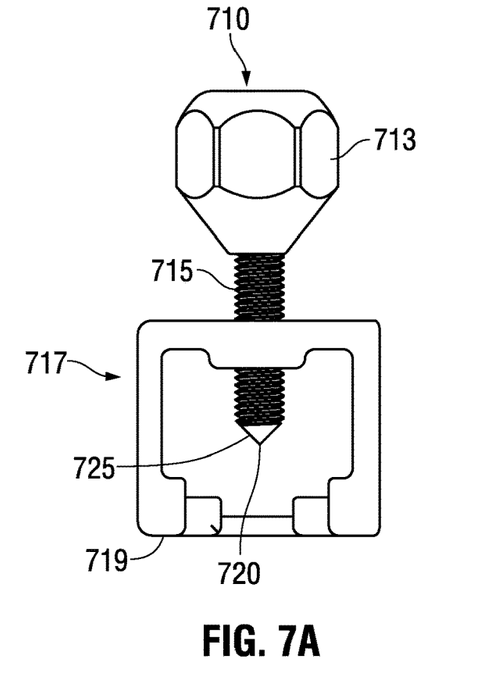
FIG. 7A is a front view of an embodiment of a treat gripper.

FIG. 7A is a front view of an embodiment of a treat gripper. Treat gripper 710 includes handle 713, threaded rod 715 extending through and held by a threaded hole (not shown) in gripper frame 717 and terminating in a displaceable gripping surface 725 including a pointed tip 720. Displaceable gripping surface 725 opposes lower frame element 719. In an embodiment, threaded rod 715 and displaceable gripping surface 725 may be pointed screw.

Figure 7B:
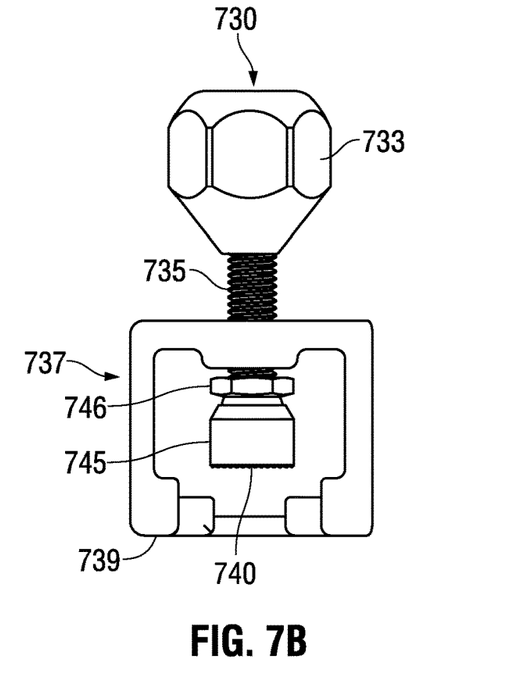
FIG. 7B is a front view of another embodiment of a treat gripper.

FIG. 7B is a front view of another embodiment of a treat gripper. Treat gripper 730 includes handle 733, threaded rod 735 extending through and held by a threaded hole (not shown) in gripper frame 737 and terminating in a displaceable gripping surface 740 including a swivel head 745 secured to threaded rod 735 with nut 746. In an embodiment swivel head 745 screws onto threaded rod 735. Displaceable gripping surface 740 opposes lower frame element 739. In an embodiment, swivel head 740 may include teeth.

Figure 7C:
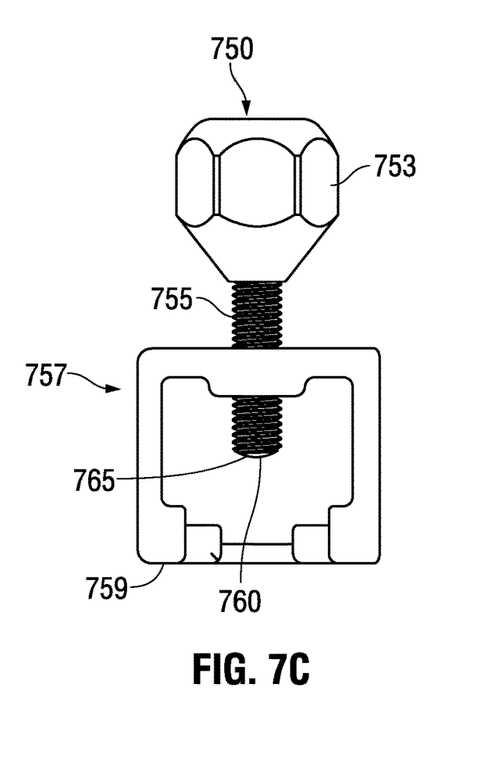
FIG. 7C is a front view of another embodiment of a treat gripper.

FIG. 7C is a front view of another embodiment of a treat gripper. Treat gripper 750 includes handle 753, threaded rod 755 extending through and held by a threaded hole (not shown) in gripper frame 757 and terminating in a displaceable gripping surface 765 including a semi-spherical tip 760. Displaceable gripping surface 765 opposes lower frame element 759.

Figure 7D:
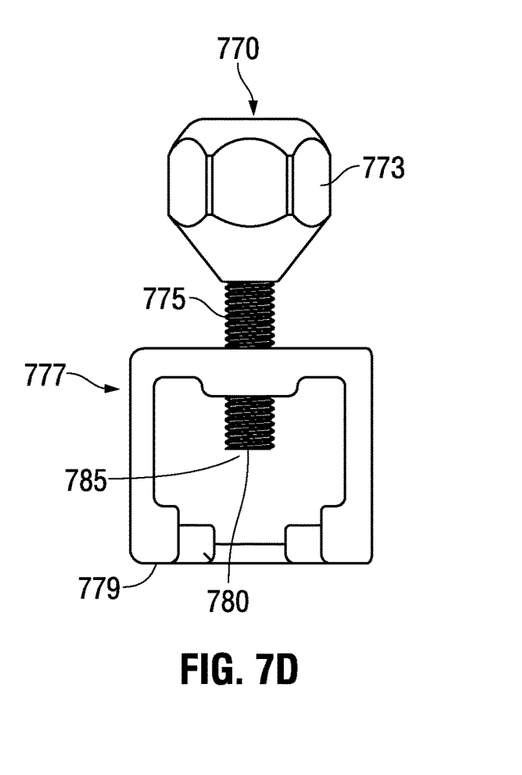
FIG. 7D is a front view of another embodiment of a treat gripper.

FIG. 7D is a front view of another embodiment of a treat gripper. Treat gripper 770 includes handle 773, threaded rod 775 extending through and held by a threaded hole (not shown) in gripper frame 777 and terminating in a displaceable gripping surface 785 with planar surface 780. Displaceable gripping surface 785 opposes lower frame element 779.

In other embodiments, not illustrated, the displaceable gripping surface may include a horizontal bar or jaw (with or without teeth) that extends across all or part of the interior of cavity of the gripper frame or an internal frame defining a ridged, triangular or pyramid-shaped opening. In an embodiment the ridged, triangular or pyramid-shaped opening mirrors all or part of the shape of the lower frame element. In these and similar embodiments it is possible to hold more than one treat within the gripper frame at a time.

In embodiments of a treat gripper (including for example treat grippers 710, 730, 750, and 770), by rotating the handle, the displaceable gripping surface can be tightened toward the lower frame element to securely grip or clinch a dog treat between the lower frame element and the displaceable gripping surface. Rotating the handle in the other direction loosens the gripping surface to release the dog treat (or what is left of it).

In an embodiment, clinchers with displaceable gripping surfaces are interchangeable. Interchangeable pieces allow optimal clamping for different shapes and hardness. A pointed metal screw (for example, 725, 720) can be used to securely hold softer pizzle or bully sticks. In an embodiment, the point of the pointed metal screw includes a 45-degree angle. The point on the screw will penetrate the stick to hold it in place and the metal point will not dull. A planar gripping surface (for example, 785) or semi-spherical gripping surface (for example, 760) or swivel head (for example, 745) can hold a yak cheese stick in place where the point of the screw will not break the cheese stick.

Figure 8:
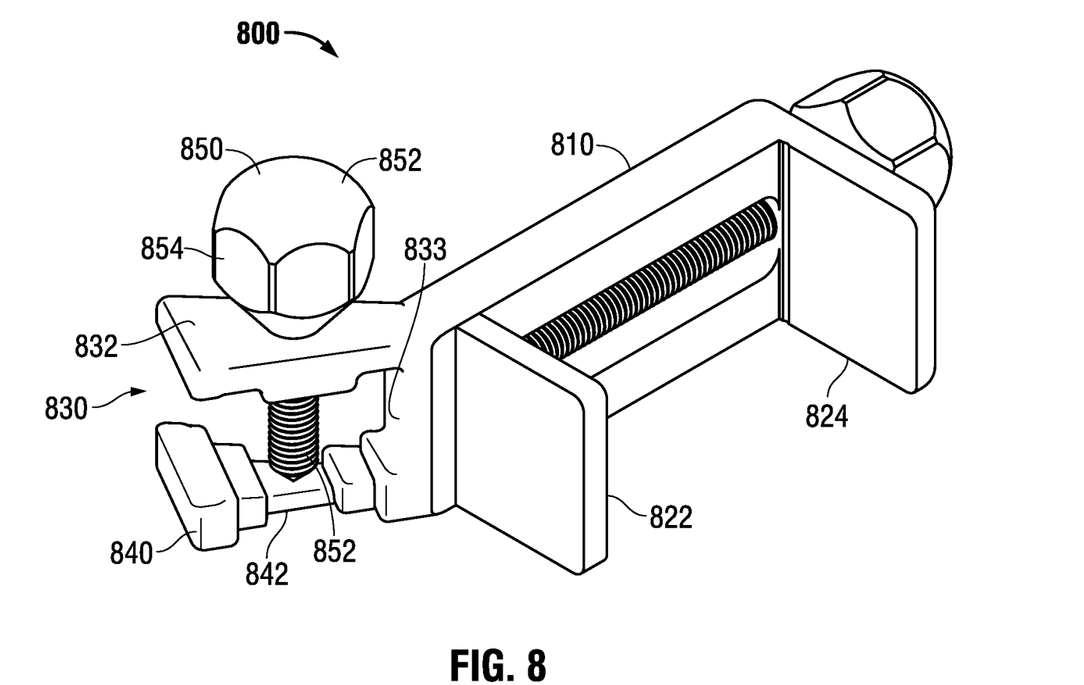
FIG. 8 is a perspective view of an alternative embodiment of an exemplary pet treat holder.

FIG. 8 is a perspective view of an alternative embodiment of an exemplary pet treat holder. Pet treat holder 810 includes body 810, clamp jaws 822, 824, and gripper frame 830 including upper frame element 832, lower frame element 842, gripper base 842, and gripping screw 852. In this embodiment gripper frame 830 does not include an outer frame element. Gripper frame 830 is an embodiment of an open gripper frame design, as compared to gripper frame 130 in FIG. 1. The open frame design is useful when the dog treat is too wide to fit within a closed frame but can be secured between gripper base 842, gripping screw 852 and, optionally, inner surface 833 of gripper frame 830.

Figure 9:
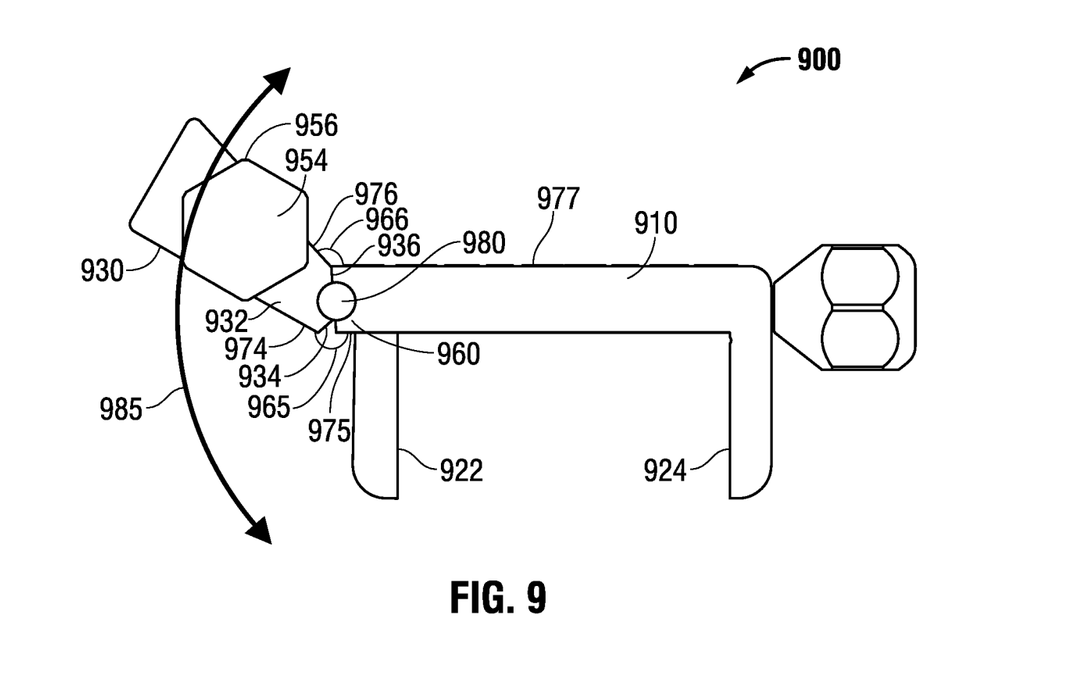
FIG. 9 is a top view of an alternative embodiment of an exemplary pet treat holder.

FIG. 9 is a top view of an alternative embodiment of an exemplary pet treat holder. Pet treat holder 900 includes body 910, clamp jaws 922, 924, and gripper frame 930. In this embodiment, gripper frame 930 rotates over arc 985 around pin (or hinge) 980 inserted in the neck of body 910. Gripper frame 930 includes beveled surfaces 934, 936, which accommodate rotation of gripper frame 930 over arc 985 and which may be rotated into abutment with body 910. In FIG. 9, gripper frame 930 has been rotated so that beveled surface 936 abuts body 910, and there is a gap between beveled surface 934 and body 910. In an embodiment, after rotation thorough arc 985, gripper frame may be angled relative to body 910 as gripper frame 230 is angled relative to body 210 in FIG. 2. In an embodiment, after rotation through angle 985, gripper frame 930 can be secured in place in relation to body 910. Gripper frame 930 can be locked in place by an external clamp (not shown) or internal or external latches (not shown).

Gripper frames may be interchangeable. In an alternative embodiment (not shown), the gripper frame is affixed to the body with a hinge pin to allow removal and substitution of another gripper frame. It may be desirable, for example, to substitute a larger gripper frame to accommodate larger pet treats.

The embodiments of pet treat holders disclosed herein include rounded handles (or knobs) with hexagonal (or generally hexagonal) faceted perimeters for the gripper handle and clamp handle. Gripper handle 154 and clamp handle 128 in FIG. 1 are rounded and have generally hexagonal faceted perimeters 155, 129 with fillets (e.g., 156). Gripper handle 954 in FIG. 9 has a hexagonally shaped perimeter 956. Gripper handle 850 in FIG. 8 includes rounded top 852 and a perimeter 854 which is generally hexagonal or hexagonal with fillets between the six hex sides. The fillets between the hex sides in embodiments reduce the number of sharp edges in the design. In an embodiment, the handles are ball shaped. The rounded or hexagonal shape is advantageous because, in use, the dog's eyes and face may be close to the pet treat holder, and there are no extending handle grips or protrusions that may poke or otherwise injure the dog in the eye or face.

Figure 10A:
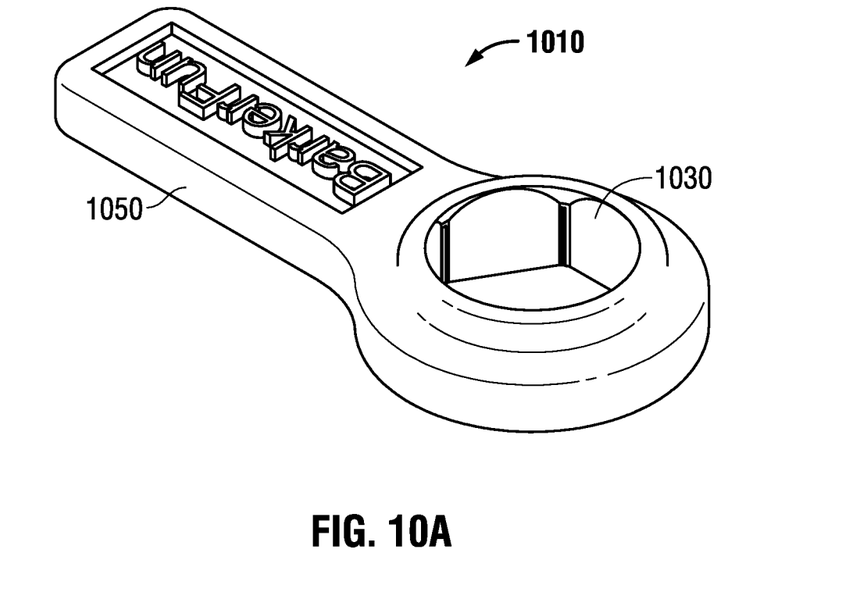
FIG. 10A is a perspective of pet treat holder wrench.
Figure 10B:
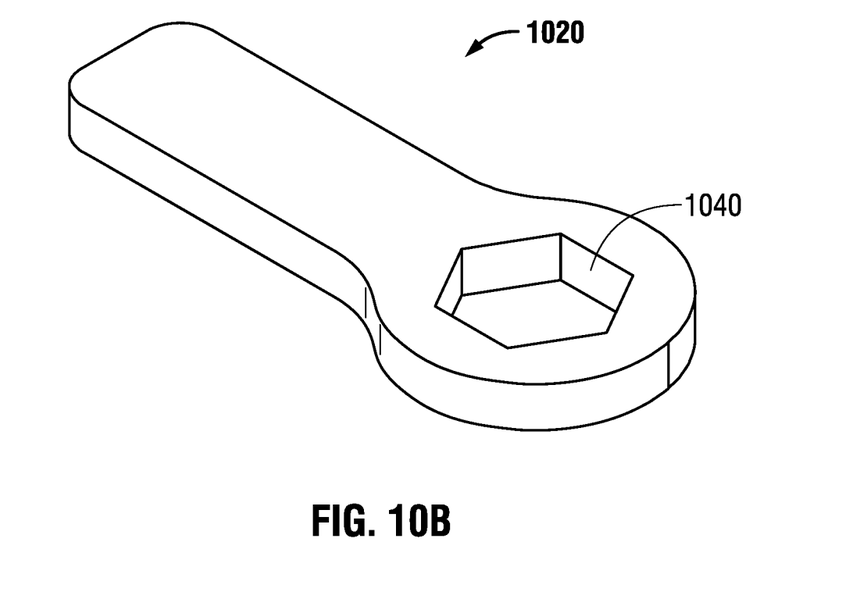
FIG. 10B is a perspective of an alternative embodiment of a pet treat holder wrench.

A wrench may be used to help turn the clamp handle (to secure the pet treat holder to a support) or the gripper handle (to secure a pet treat). FIGS. 10A and 10B illustrate exemplary pet treat holder wrenches 1010 and 1020, which are shaped to fit the faceted hexagonal (or generally hexagonal with fillets) perimeters of the embodiments of handles disclosed herein. Other circular or polygonally-shaped perimeters are within the scope of the invention.

Figure 11A:
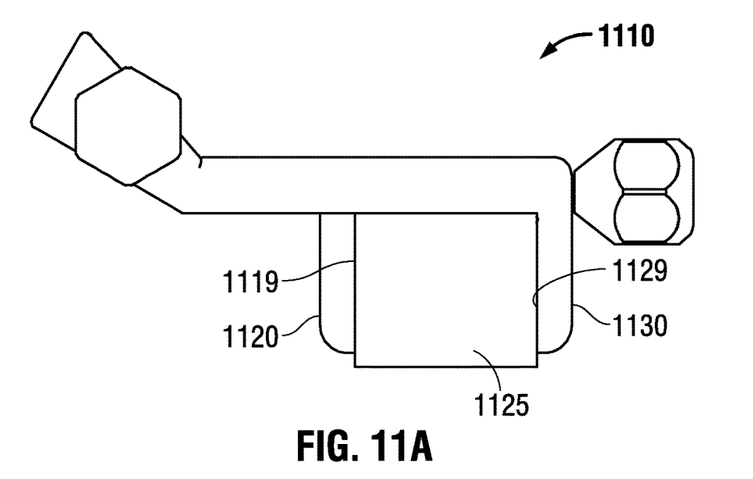
FIG. 11A is a perspective of an exemplary pet treat holder clamped to a fixed object.
Figure 11B:
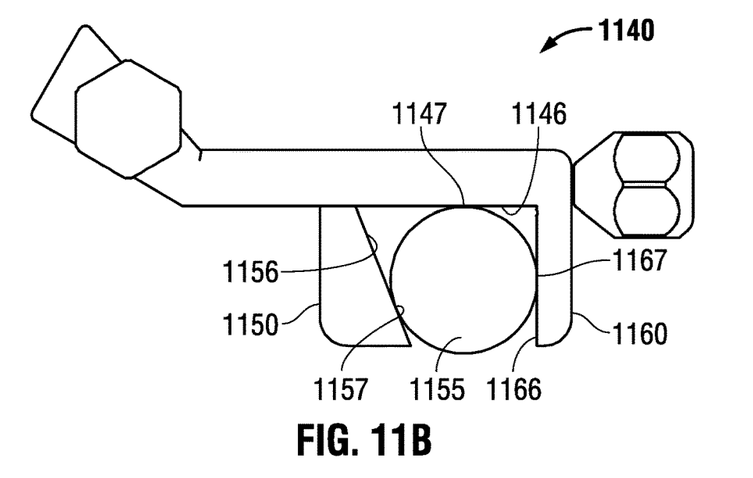
FIG. 11B is a perspective of an exemplary pet treat holder clamped to a fixed object with an alternative embodiment of a clamp.
Figure 11C:
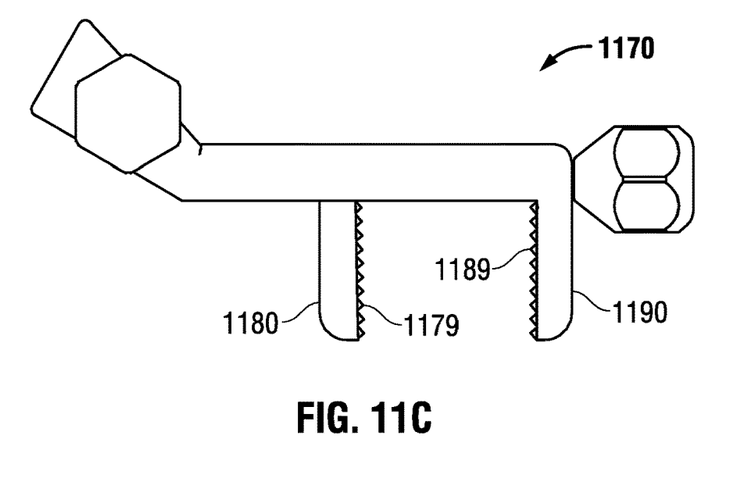
FIG. 11C is a perspective of an exemplary pet treat holder with another alternative embodiment of a clamp.

FIGS. 11A, 11B, and 11C show alternative embodiments of the clamp jaws for an exemplary pet treat holder. Pet treat holder 1110, illustrated in FIG. 11A, has clamp jaws 1120 and 1130 with planar or substantially-planar inside clamping surfaces 1119, 1129 adapted for securing the pet treat holder to a square post 1125.

Pet treat holder 1140, illustrated in FIG. 11B, has clamp jaws 1150 and 1160, where fixed jaw 1160 has a planar inside clamping surface 1166 orthogonal to body 1145, and the inside clamping surface 1156 of moveable jaw 1150 is inclined so as to meet body 1146 at an angle. Pet treat holder 1140 provides three points of contact between the clamp and the support 1155, including point 1157 on moveable jaw 1150, point 1147 on body 1146, and point 1167 on fixed jaw 1160. This embodiment is adapted for securing the pet treat holder to a fixed object having a circular shape (for example, a pole or table leg) or a rounded or partially rounded surface. In alternative embodiments, the fixed jaw may have an inclined inside clamping surface and the inside clamping surface of the moveable jaw may be orthogonal to body 1146, or each clamp jaw may have and inclined inside clamping surface.

In pet treat holder 1170, illustrated in FIG. 11C, jaws 1180 and 1190 have inside clamping surfaces 1179, 1189. In an embodiment, inside clamping surfaces 1179, 1189 have teeth, knobs, ridges, or other protrusions for improved gripping ability. In another embodiment, inside clamping surfaces have fasteners (for example, hook and loop) for a more secure grip. In another embodiment, inside clamping surfaces 1179, 1189 include rubber or plastic pads to prevent scratching or otherwise protect furniture.

Figure 12:
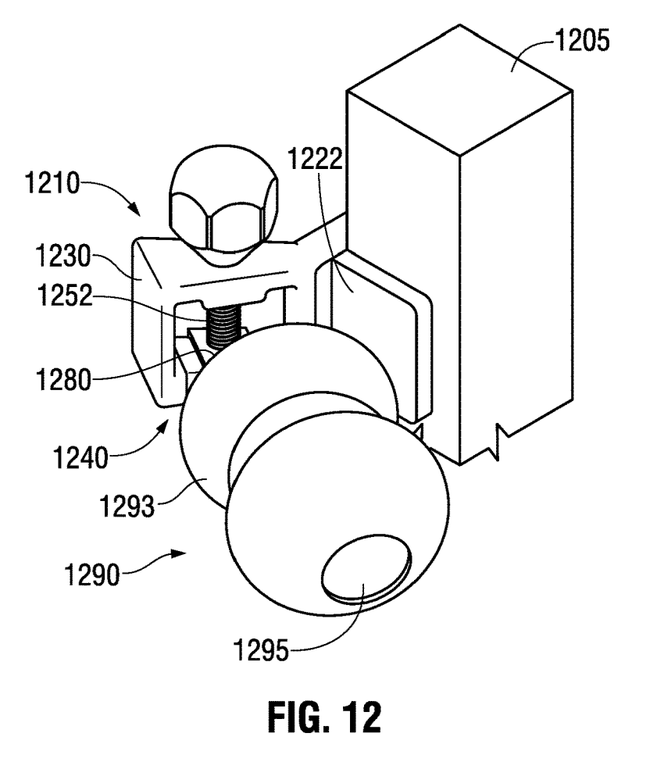
FIG. 12 is a perspective of an exemplary pet treat dispenser affixed to an exemplary pet treat holder.

In an embodiment, the pet treat holder can securely hold accessories. For example, a pet treat dispenser can be secured to the pet treat holder. FIG. 12 is a perspective of an exemplary pet treat dispenser 1290 affixed to an exemplary pet treat holder 1210 when it is secured to post 1205. Pet treat dispenser 1290 can be any pet treat dispenser that can dispense edible pet treats while mounted on pet treat holder 1210. In an embodiment, pet treat dispenser includes hollow body 1293 in which edible dog treats can be stored, and opening 1295, which allows a dog to lick or otherwise access the dog treats inside hollow body 1293. An exemplary embodiment of a suitable pet treat dispenser is described in expired U.S. Pat. No. 5,865,146 for a Bouncing Pet Toy. Pet treat dispenser 1290 is affixed to pet treat holder 1210 by clip 1280, which is secured by gripper screw 1252. In an embodiment, gripper screw 1252 extends through an opening (not shown) in clip 1280; and in another embodiment, clip 1280 is secured between lower frame element 1240 of gripper frame 1230 and the displaceable gripping surface (not shown) of gripper screw 1252. In an embodiment, clip 1280 is inserted into an opening (not shown) in pet treat dispenser 1290 to secure pet treat dispenser 1290 to pet treat holder 1210.

Figure 13:
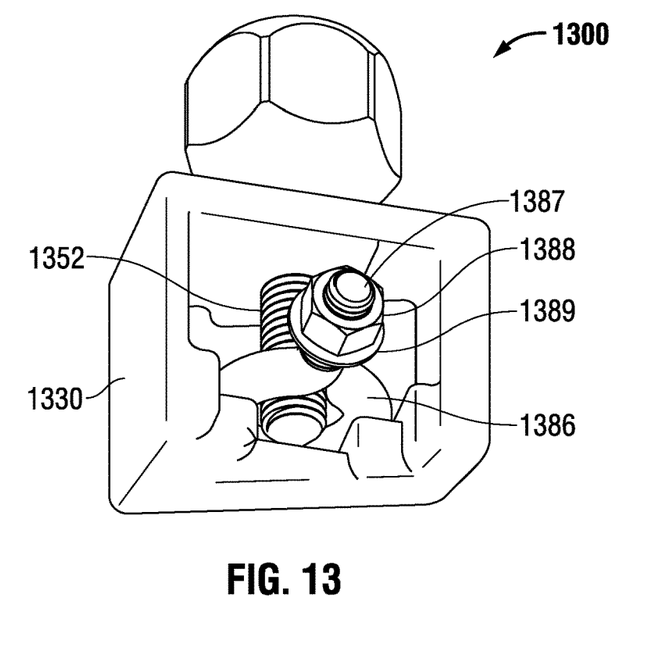
FIG. 13 is a perspective view of an exemplary pet treat holder with an exemplary pet treat dispenser clip.

FIG. 13 is a perspective view of a gripper frame 1330 of an exemplary pet treat holder (not shown) with an exemplary pet treat dispenser clip assembly 1380. Pet treat dispenser clip assembly 1380 includes eye bolt 1386 including bolt 1387, nut 1388 and washer 1389. In an embodiment, pet treat dispenser clip assembly 1380 may be attached to an exemplary pet treat dispenser (not shown) by inserting bolt 1387 through an opening in the pet treat dispenser, through washer 1389 and nut 1388 inside the cavity of the pet treat dispenser and tightening the nut. The pet treat dispenser can be affixed to the pet treat holder by inserting gripping screw 1352 through the "eye" opening in eye bolt 1386.

Figure 14A:
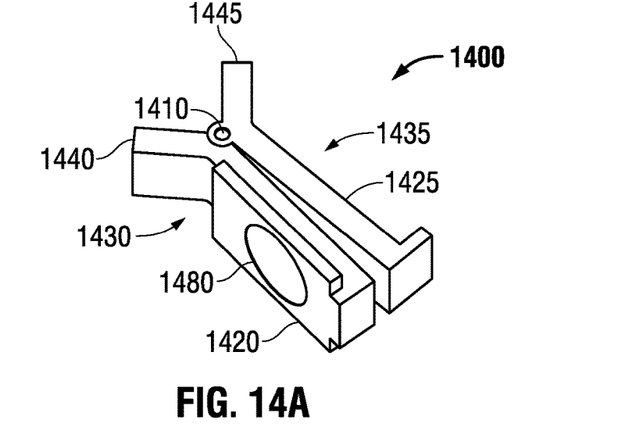
FIGS. 14A and 14B are perspective views of an alternative embodiment of a pet treat dispenser clip.
Figure 14B:
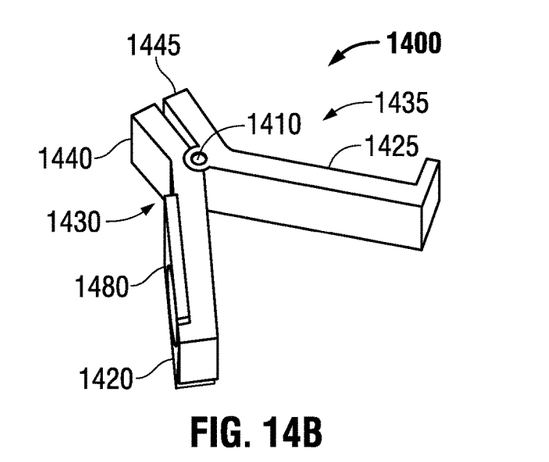

FIGS. 14A and 14B are perspective views of an alternative embodiment of a pet treat dispenser clip 1400. Dispenser clip 1400 includes angled legs 1430 and 1435 joined by pin 1410. Angled leg 1430 includes a gripper end 1420 and a dispenser end 1440, and angled leg 1435 includes a gripper end 1425 and a dispenser end 1445. In an embodiment, the angle between the gripper end and the dispenser end of angled legs 1430 and 1435 is in the range of 30-90 degrees, including 40-80, and 50-70 degrees. In an embodiment, angled leg 1430 includes a conical recess 1480 which receives the gripper screw of an exemplary pet treat holder to secure the clip 1400 to the pet treat holder.

FIG. 14B shows a disengaged configuration of clip 1400. Dispenser ends 1440, 1445 are forced together so that they are adjacent, which forces gripper ends 1420, 1425 apart. When adjacent to each other, dispenser ends 1440, 1445 form a small profile that fits within the opening of a pet treat dispenser (not shown). FIG. 14A shows the engaged configuration of clip 1400. After adjacent dispenser ends 1440, 1445 have been inserted through the opening and into the cavity of a pet treat dispenser (not shown), gripper ends 1420 and 1425 are forced together into an adjacent position, which forces dispenser ends 1440, 1445 apart within the cavity of the pet treat dispenser (not shown). When the dispenser ends 1440, 1445 are in their separated configuration (as illustrated in FIG. 14A), they securely grip the pet treat dispenser from the interior of the dispenser. In an embodiment, gripper ends 1420, 1425 can be latched together with a latch (not shown).

Figure 15A:
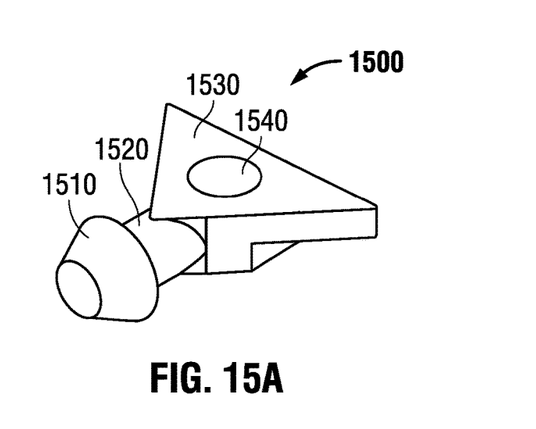
FIGS. 15A and 15B are perspective views of another alternative embodiment of a pet treat dispenser clip.
Figure 15B:
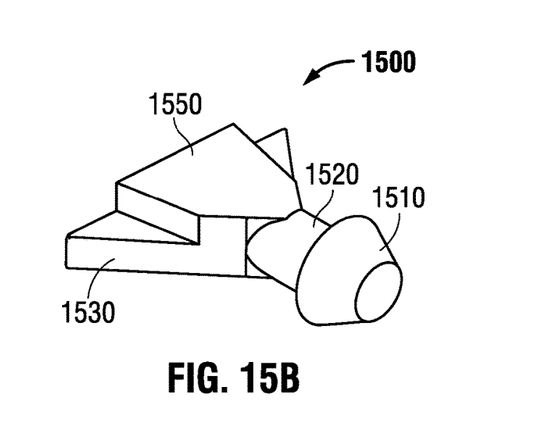

FIGS. 15A and 15B are perspective views of another alternative embodiment of a pet treat dispenser clip 1500. Pet treat dispenser clip 1500 includes plug 1510, shaft 1520, upper body 1530, and lower body 1550. Preferably the diameter of shaft 1520 is smaller than the diameter of the opening of a pet treat dispenser (not shown), so that it can be inserted inside the dispenser, and the external diameter of plug 1510 is larger than the opening of the pet treat dispenser so that when inserted it securely grips the pet treat dispenser from the inside. In an embodiment, upper body 1530 and lower body 1550 are shaped to fit into the cavity formed by the stepped ridges of the lower frame element of the gripper frame of an exemplary pet treat holder.

Figure 16A:
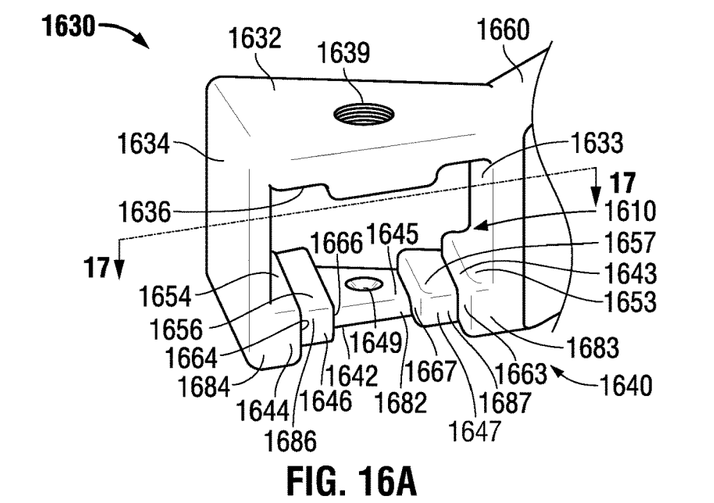
FIG. 16A is a perspective view of an embodiment of a clincher frame.
Figure 16B:
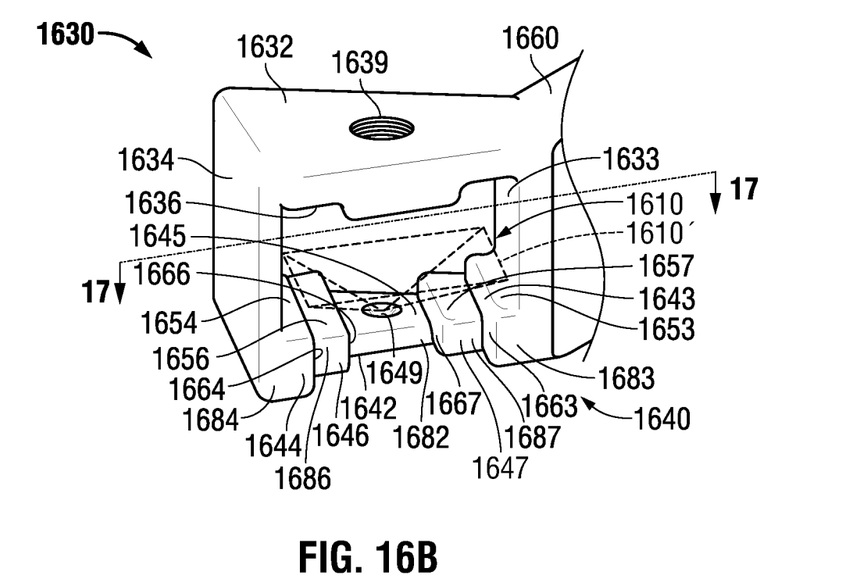
FIGS. 16B and 16C are alternative perspective views of an embodiment of a clincher frame.

FIG. 16A is a perspective view of an embodiment of a clincher frame. Clincher frame 1630 includes an upper frame element 1632, an outer frame element 1634, inner surface 1633, and lower frame element 1640. Upper frame element 1632 includes threaded hole 1639 through which a gripping screw (not shown) extends. Lower frame element 1640 includes a gripper base 1642, gripper base riser 1682, and gripper base top surface 1645 with, in an embodiment, recess 1649, which in an embodiment may be conical, to receive the end of a gripping screw (not shown). Lower frame element 1640 also includes stepped ridges 1644, 1646, 1647, and 1643. The stepped ridges 1644, 1646, 1647, 1643 include: treads 1654, 1656, 1657, 1653; risers 1664, 1666, 1667, and 1663; and inner ridge sides 1684, 1686, 1687, and 1683. Each tread, in an embodiment, includes a substantially planar surface that opposes the bottom surface 1636 of upper frame element 1632 and the displaceable gripping surface on the gripping screw (not shown). In an embodiment, the planar surfaces of risers 1664 and 1666 oppose the planar surfaces of risers 1667 and 1663. In relation to the geometry of clincher frame 1630, the treads are horizontal planar surfaces, and the risers and inner ridge sides are vertical planar surfaces. In an embodiment, stepped ridges 1644, 1646, 1647, 1643 and upper surface 1645 of gripper base 1642 define a cavity 1610 having the three-dimensional shape within clincher frame 1630 of an inverted pyramid, or an inverted stepped pyramid, with the tip of the inverted pyramid in the recess 1649. Cavity 1610 is also illustrated as cavity 1610' (shown in broken lines) in FIG. 16B.

Figure 16C:
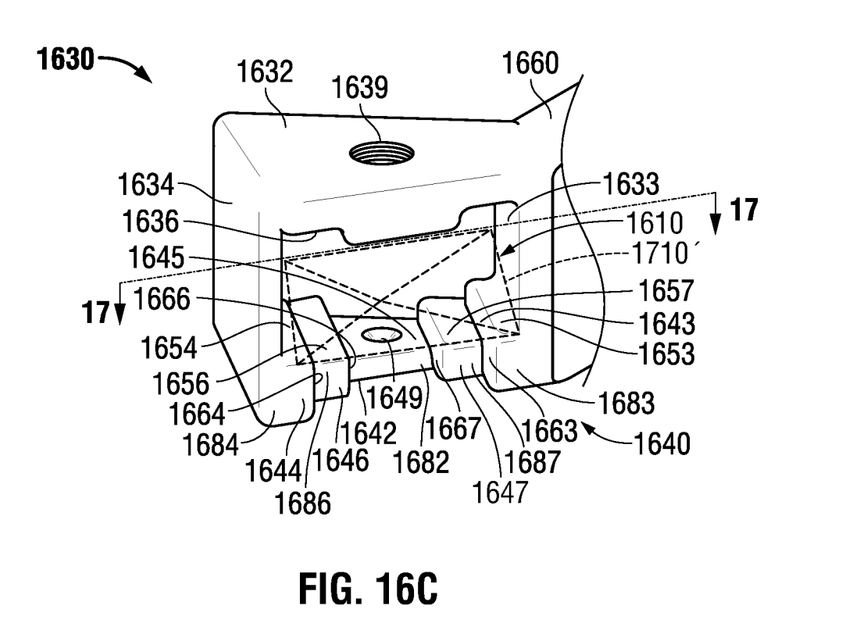
Figure 17:
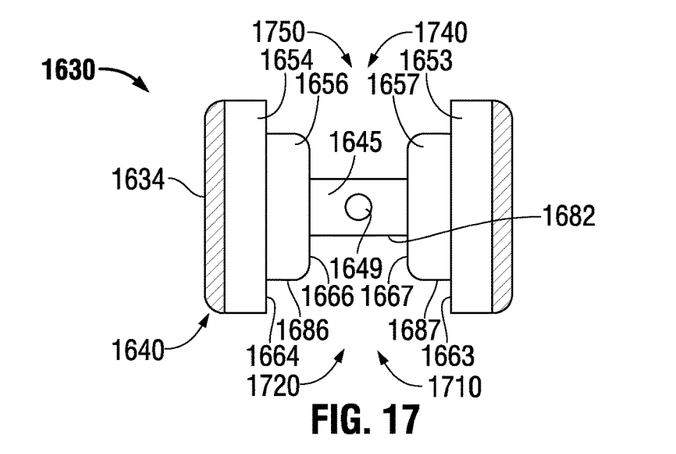
FIG. 17 is a sectional view of an embodiment of a clincher frame.

FIG. 17 is a sectional view from above of lower frame element 1640 in FIG. 16A, showing stepped ridges 1644, 1646, 1647, and 1643, treads 1654, 1656, 1657, and 1653, upper surface 1645 of gripper base 1642, and recess 1649. A three-dimensional cavity 1710 is defined by elements of stepped ridges 1644, 1646, 1647, and 1643, including riser 1664, inner ridge side 1686, riser 1666, gripper base riser 1682, riser 1667, inner ridge side 1687, and riser 1663. Three-dimensional cavity 1710 also has the shape of an inverted pyramid whose generally-rectangular base opens onto inside aspect 1720. Three-dimensional cavity 1710 is also illustrated as cavity 1710' (shown in broken lines) in FIG. 16C.

In an embodiment, ridges 1644, 1646, 1647, and 1643 define a stepped ridge structure in the plane of lower frame element 1640 on the outside aspect 1740 of gripper frame 1630, which is symmetrical to the stepped ridge structure on inside aspect 1720 and which when combined with treads 1654, 1656, 1657, 1653, risers 1664, 1666, 1667, 1663, and outside aspect ridge sides (not numbered) define a three-dimensional cavity 1750 in the shape of an inverted pyramid whose generally-rectangular base opens onto outside aspect 1740. In an alternative embodiment (not shown), ridges 1644, 1646, 1647, and 1643 define a symmetrical stepped ridge structure in the plane of lower frame element 1640 on the inside aspect 1720 of gripper frame 1630 but not on the outside aspect 1740 of gripper frame 1630. In an alternative embodiment (not shown), ridges 1644, 1646, 1647, and 1643 define a symmetrical stepped ridge structure in the plane of lower frame element 1640 on the outside aspect 1740 of gripper frame 1630 but not on inside aspect 1720 of gripper frame 1630.

Figure 18:
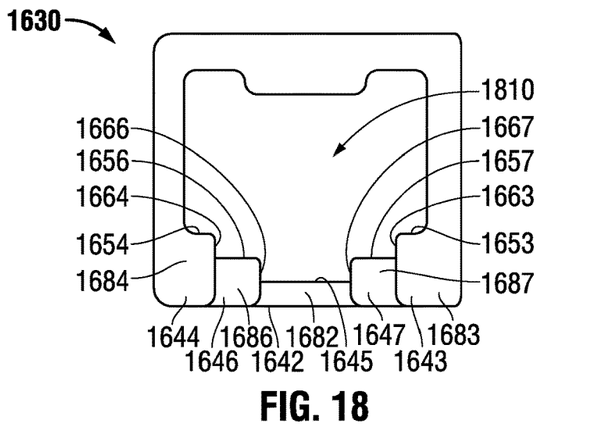
FIG. 18 is a front view of an embodiment of a clincher frame.

FIG. 18 is a front view of clincher frame 1630 showing stepped ridges 1644, 1646, 1647, and 1643, inner ridge sides 1686, 1687, and gripper base riser 1682. FIG. 18 also shows, in profile, treads 1654, 1656, 1657, 1653, and risers 1654, 1666, 1667, and 1663. A three-dimensional cavity 1810 is defined by elements of stepped ridges 1644, 1646, 1647, and 1643, including tread 1654, riser 1664, tread 1656, riser 1666, gripper base upper surface 1645, riser 1667, tread 1657, riser 1663, and tread 1653.

In an embodiment, in conjunction with the pressure provided by a gripping screw by and through a displaceable gripping surface, the stepped ridges in cavity 1610 provide multiple gripping surfaces (including edges and corners where surfaces join) to securely clinch pet treats of all shapes and sizes. In addition, the pyramid or flared shape of cavities 1710 and 1810 give the dog more and improved access to a greater portion of the treat or dog toy so that the dog can consume more or a larger proportion of the treat.

In an embodiment (not illustrated), pet treat holder includes a clip or openings to secure a leash. In an embodiment, each clamp jaw includes a clip opening through which a leash may be inserted.

A variety of materials can be used to produce different embodiments of the product. One embodiment is plastic, such as injection molded plastic. An alternative embodiment is made of aluminum, which may be anodized. Alternative materials for components or the entire product include other metals, nylon or other plastic materials, recycled plastics and other materials, rubber, wood, and the like.

In an embodiment, the pet treat holder is made of aluminum, which is preferably anodized for outside use. The body and clincher frame are made by machining and milling a single ingot or piece of aluminum. Whenever it is disclosed herein that one component may be affixed to another, affixing encompasses the situation where the two components are integral, a single part, and also situations where the components are joined, assembled, or attached by cement, epoxy, or other adhesive, welding, soldering, press fit, screws, nuts and bolts, a threaded joint, pins, hinges, clips, nails, rivets, or any other type of joinder, assembly or attachment known to one of skill in the art.

Nylon or plastic embodiments of the pet treat holder may be infused with a substance that imparts a bitter or disagreeable taste to dogs to prevent dogs from chewing on the pet treat holder. Oils, scents or flavoring can be added to the plastic before or during molding or manufacture or applied to the pet treat holder after manufacture to discourage chewing the product. Exemplary anti-chewing oils, scents, or flavoring include citrus, *eucalyptus*, tea tree, hot pepper, mint, vinegar, alcohol, and ground spices.

In an embodiment, the product may include weep holes to prevent the accumulation of rainwater.

In use, the pet treat holder is secured to a structural element or other fixed object so the dog can aggressively and safely chew dog treats. The pet treat holder can be clamped onto a table leg, picnic tabletop, bench or support piece, chair, post, deck, pole, or door jamb, or any other stable and secure structural element or other fixed object within the span of the clamp. The pet treat holder can be installed upside down, right side up, sideways left, sideways right, up, or down to provide flexibility for deployment and maximum clearance for a dog to chew without interfering with a table leg, fence post or other structural element. The treat itself can be secured in a variety of positions within the gripper frame, including, for example, straight, 45 degrees left, or 45 degrees right on both sides.

Unlike conventional unmounted pet treat holders, the embodiments of a pet treat holder disclosed herein keep the dog toys and treats in the air and off the ground, out of the dirt, and, if used indoors, off the carpet. Mounting the treat or toy in the air and off the ground keeps the dog treat clean, minimizes the amount of dirt consumed by the dog, and solves the problem of dogs slobbering all over the floor, carpet, or furniture. This is good for dog and good for the carpet. The pet treat holder can be positioned under an outside table so the dog can use the device when it is raining. The pet treat holder can be installed in a special place inside the home, so it is not dragged around on carpets or expensive hardwood floors.

The pet treat holder uses a convenient handle grip so anyone can tighten the clamp to mount the pet treat holder on a structure. The clamp can be easily tightened during use if the dogs are super aggressive pullers.

Embodiments of a pet treat holder disclosed herein can securely hold treats and toys of different shapes and sizes, including conventional dog treats (e.g., pizzle stick, cheese stick, bone, antler, etc.) which typically range from a 0.25" to 1.5" roughly cylindrical pizzle to a 1.5" roughly rectangular cheese stick. In an aspect, the "inverted pyramid" gripper allows both cylindrical as well as square shapes to be adequately secured.

The pet treat holder firmly secures the treat so it cannot be removed by the dog. It holds the treat or toy so that the dog does not remove it to hide it or bury it, and it holds it so that it does not break off dangerously in the dog's mouth. When the dog is finished with the treat, a small remaining piece can be removed and discarded. Conventional pet treat holders do not firmly secure the treat, which makes it hard to remove the remains of the treat after the dog is finished with it. In other conventional pet treat holders, the device itself consumes so much of the treat that the treat is inaccessible to the dog. Embodiments can hold more than one pet toy or pet treat at a time.

The pet treat holder also can hold a pet treat dispenser or a pet toy designed to dispense or release pet treats such as peanut butter, eat, or cheese snacks.

Applications abound for embodiments of the pet treat holder disclosed herein. Embodiments of the pet treat holder can hold a leash, a hose, a bubble maker, and/or a flashlight. In a dog grooming environment, for example, the pet treat holder can securely hold the dog's leash while the dog is being groomed, a hose, or a pet treat dispenser filled with frozen peanut butter, food, cheese or other high-value treats so the dog remains occupied and still while the owner or groomer clips or uses a nail grinder on the dog's nails.

Although this disclosure describes embodiments of a pet treat holder adapted for use with dogs, dog treats, and dog toys, the scope of the invention is not so limited to those embodiments. Embodiments of the pet treat holder disclosed herein can hold items for dogs and other animals of all sizes. Because the pet treat holder can be mounted at different heights to match the animal's jaw height when the animal is in a standing position, it naturally accommodates animals of all sizes. It is strong enough to hold treats for large pets and other animals, including farm and ranch animals, zoo animals, and deer and other wildlife (for example, salt or protein for wildlife feeders). It is flexible enough to hold treats for small animals. In short, references to a "pet" includes any animal (including without limitation dogs); and references to a pet toy or pet treat includes toys, treats, or edible items consumed, chewed, licked, or played with by any animal, including without limitation dogs.

Embodiments of the pet treat holder disclosed herein can securely hold a wide variety of shapes of items. The large clamping area allows various items to be secured. The staircase V clamp or inverted pyramid-shaped cavity securely holds dog toys and treats in a wide variety of shapes, including for example, cylinder, rectangle, and other diverse, regular or irregular, symmetrical or asymmetrical, shapes and configurations. The ridged surfaces are used to aid in securing various items. The swivel head clamp allows securing odd-shaped items. Because one size fits many sizes of dog and dog treat efficiently and effectively, there is no need to buy multiple devices.

Embodiments of the pet treat holder disclosed herein can be easily used by the novice and physically challenged. The operation of the sophisticated table leg clamp is simple and intuitive.

Embodiments of the pet treat holder disclosed herein are weatherproof for outdoor use. For indoor use, embodiments use plastic rubber pads on the clamp jaws to protect furniture, and the threaded rod is secured within the pet treat holder to protect furniture. Embodiments made of nylon or other plastics do not scratch furniture.

In an aspect, embodiments of the pet treat holder disclosed herein employ a double vise or (double clamp) device. The first vise (or clamp) will secure the holder to a table leg, handrail, porch overhang, heavy chair leg, or any sturdy fixture, structural element, or other fixed object that will not yield to a dog pulling. The second vise (or clamp) will hold in place a dog treat or dog toy, for example, a pizzle stick, yak cheese stick, bully stick, rawhide stick, bone, antler or other food item or chew toy.

In an aspect, embodiments of the pet treat holder disclosed herein are designed to be safe for dogs. Rounded edges are used instead of sharp edges or pointy rods. It provides a safe distance between the clamp and the animal treat. It may be made of materials that are dog safe. Small parts are not used to avoid creating a choking hazard. In an embodiment, all parts exceed Consumer Product Safety Commission standards for choking hazards. By securely holding the dog treats while the dog is chewing or playing with it, it is less likely that large parts of the dog treat will break off and become struck in the dog's throat or esophagus.

In an aspect, embodiments of the pet treat holder disclosed herein are portable and easy to pack for a trip to the dog park or across the country.

In an aspect, embodiments of the pet treat holder disclosed herein are easy to clean with a hose, dishwasher safe, and recyclable.

In an alternative embodiment, a pet treat holder may be equipped with a sensor, to sense when the pet treat holder has been consumed, a simple computer system with processor, on-board instructions, and on-board memory, and an alarm or radio transmitter (e.g., a Bluetooth transmitter) to provide an electronic alert to the dog owner or to any smart device in range (cellphone, computer, watch, etc.) that the dog is finished with treat and now may be getting into mischief. In an embodiment, the sensor could measure vibration. If a vibrating pattern was recognized the sensor would detect that the dog is still eating the treat. When the vibration has stopped for a period of time the sensor would determine that the dog is finished.

This disclosure describes functional details of embodiments of a pet treat holder. Embodiments of a pet treat holder, including aspects mentioned herein, may also include ornamental and/or non-functional design elements.

Relational terms (including without limitation, upper and lower, top and bottom, inside and outside, inner and outer) are used in this disclosure to illustrate the relationships between components of the exemplary embodiments described herein and do not limit the types of uses or configurations in which the pet treat holder may be oriented or used.

Although embodiments of the present invention have been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A pet treat holder, comprising a body, a clamp affixed to the body, and a gripper frame affixed to the body, said gripper frame comprising a treat gripper, a first ridged frame element and a second frame element opposed to the first ridged frame element, wherein the first ridged frame element which comprises two or more stepped ridges opposed to the second frame element, defines a first cavity in the shape of an inverted pyramid within the gripper frame, wherein the two or more stepped ridges opposed to the second frame element comprise a first stepped ridge comprising a first ridge tread and a first ridge riser, and a second stepped ridge comprising a second ridge tread and a second ridge riser, wherein the second ridge riser opposes the first ridge riser and the first and second ridge treads oppose the second frame element, wherein the first cavity is adapted and configured to secure pet treats of different shapes and sizes, whereby the pet treat holder is adapted and configured to prevent removal of the treat from the pet treat holder while the pet is actively using the pet treat.

2. The pet treat holder of claim 1 wherein the clamp comprises a first jaw with a first gripping surface and a second jaw with a second gripping surface that is angled relative to the first gripping surface.

3. The pet treat holder of claim 1 wherein a rear surface of the gripper frame meets a rear surface of the body at an angle between 90-180 degrees and a front surface of the gripper frame meets a front surface of the body at an angle between 180 and 270 degrees.

4. The pet treat holder of claim 1 wherein the gripper frame comprises a body side and a distal side opposed to the body side, wherein the width of the distal side is greater than the width of the body side.

5. The pet treat holder of claim 1 wherein the treat gripper comprises a displaceable gripping surface opposed to the first ridged frame element.

6. The pet treat holder of claim 5 wherein the treat gripper is adapted and configured to securely grip a pet treat between the displaceable gripping surface and the first ridged frame element.

7. The pet treat holder of claim 5 wherein the displaceable gripping surface is selected from the group consisting of a flat surface, a pointed surface, a semi-spherical surface, an inverted pyramid, a bar, a jaw, and a swivel head.

8. The pet treat holder of claim 5 wherein the displaceable gripping surface is affixed to a threaded rod.

9. The pet treat holder of claim 8 wherein the threaded rod is threadedly secured in the second frame element.

10. The pet treat holder of claim 1 wherein the first ridged frame element defines a second cavity in the shape of an inverted pyramid.

11. The pet treat holder of claim 10 wherein the second cavity is adapted and configured to expose more of the pet treat to the use of the animal.

12. The pet treat holder of claim 1 further comprising a pet treat dispenser affixed to the pet treat holder.

13. The pet treat holder of claim 1 wherein at least one of the clamp or treat gripper comprises a rounded handle comprising one or more facets adapted and configured to fit a wrench.

14. The pet treat holder of claim 1 wherein the first ridged frame element comprises two or more symmetrical stepped ridges opposed to the second frame element.

15. The pet treat holder of claim 1, wherein the first ridged element comprises two or more different substantially planar surfaces opposed to the second frame element.

16. The pet treat holder of claim 15 wherein the first ridged element comprises three or more different substantially planar surfaces opposed to the second frame element.

17. The pet treat holder of claim 1, wherein the first stepped ridge further comprises a third stepped ridge comprising a third ridge tread and a third ridge riser, and the second stepped ridge further comprises a fourth stepped ridge comprising a fourth ridge tread and a fourth ridge riser, wherein the fourth ridge riser opposes the third ridge riser, the third and fourth ridge treads oppose the second frame element, and the first stepped ridge and second stepped ridge do not abut each other.

* * * * *